(12) United States Patent
Dong

(10) Patent No.: US 6,914,627 B1
(45) Date of Patent: Jul. 5, 2005

(54) METHOD AND APPARATUS FOR DIGITAL COLUMN FIXED PATTERN NOISE CANCELING FOR A CMOS IMAGE SENSOR

(75) Inventor: Kimble Dong, Sunnyvale, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 697 days.

(21) Appl. No.: 09/085,519

(22) Filed: May 27, 1998

(51) Int. Cl.[7] .............................................. H04N 9/64
(52) U.S. Cl. ..................................................... 348/248
(58) Field of Search ................................. 348/248, 249, 348/241, 243, 246, 247, 607, 301–310; 378/98.8

(56) References Cited

U.S. PATENT DOCUMENTS

| | | | |
|---|---|---|---|
| 4,513,312 A | | 4/1985 | Takemura |
| 4,542,409 A | | 9/1985 | Ochi |
| 4,652,911 A | | 3/1987 | Teranishi et al. |
| 4,686,373 A | | 8/1987 | Tew et al. |
| 4,839,729 A | * | 6/1989 | Ando et al. ................. 348/241 |
| 4,885,467 A | * | 12/1989 | Horikawa ..................... 348/246 |
| 4,939,573 A | | 7/1990 | Teranishi et al. |
| 5,038,369 A | * | 8/1991 | Nishiki ......................... 348/607 |
| 5,089,894 A | * | 2/1992 | Higashitsutsumi ........... 348/607 |
| 5,268,764 A | * | 12/1993 | Kihara et al. ................ 348/301 |
| 5,282,025 A | | 1/1994 | Sato |
| 5,289,286 A | * | 2/1994 | Nakamura et al. ........... 348/223 |
| 5,345,266 A | | 9/1994 | Denyer |
| 5,371,362 A | * | 12/1994 | Mestais et al. ............... 348/607 |
| 5,408,314 A | * | 4/1995 | Perry et al. .................. 348/607 |
| 5,434,619 A | * | 7/1995 | Yonemoto ..................... 348/241 |
| 5,471,515 A | * | 11/1995 | Fossum et al. ............... 348/301 |
| 5,485,205 A | * | 1/1996 | Miyata ......................... 348/248 |
| 5,923,370 A | * | 7/1999 | Miethig et al. ............... 348/320 |
| 6,061,092 A | * | 5/2000 | Bakhle et al. ................ 348/243 |
| 6,215,520 B1 | * | 4/2001 | Taniji .......................... 348/249 |
| 6,219,095 B1 | * | 4/2001 | Zhang et al. ................. 348/192 |
| 6,276,605 B1 | * | 8/2001 | Olmstead et al. ......... 235/462.41 |
| 6,344,877 B1 | * | 2/2002 | Gowda et al. ................ 348/245 |

OTHER PUBLICATIONS

"CMOS Active Pixel Image Sensors for Highly Integrated Imaging Systems," by S.K. Mendis et al., IEEE Journal of Solid–State Circuits, vol. 32, No. 2, Feb. 1997.*

"¼–Inch CMOS Active Pixel Sensor with Smart On–Chip Functions and Full Digital Interface," by R. Panicacci et al., Hot Chips IX, Aug. 1997.*

D. Cormier, "Solid–State Optical Sensors Improve Their Image," *ESD: The Electronic System Design Magazine*, Jan. 1989, pp. 36–42.

(Continued)

*Primary Examiner*—Wendy R. Garber
*Assistant Examiner*—Rashawn N. Tillery
(74) *Attorney, Agent, or Firm*—Perkins Coie LLP

(57) ABSTRACT

The present invention is directed to a method and apparatus for reading out signals from a MOS image sensor. The invention allows for a relatively high fixed pattern noise canceling rate, even in low light environments. The invention includes a digital processing structure for processing the signals from a pixel array. The pixel array includes a reference row that is formed by being covered by a light shield or black layer to cover the pixels of the reference row from light. The signals from the reference row are converted to digital values and stored in fixed pattern noise storage circuitry. Then, as each of the remaining rows of the pixel array are read out, they are converted to digital values and the digital reference row signals are subtracted therefrom to produce data image signals that are relatively free of fixed pattern noise. Thus, the fixed pattern noise canceling rate is made to depend on the precision of an analog-to-digital converter, rather than the process variations of an analog subtraction circuit.

24 Claims, 4 Drawing Sheets

OTHER PUBLICATIONS

P.B. Denyer et al., "Intelligent CMOS Imaging," *Charge–Coupled Devices and Solid State Optical Sensors V*—SPIE Proceedings, San Jose, California, Feb. 1995, pp. 285–291.

E.R. Fossum, "Active Pixel Sensors: Are CCD's Dinosaurs?" *Charge–Coupled Devices and Solid State Optical Sensors III*—SPIE Proceedings, San Jose, California, Feb. 1993, pp. 2–14.

R.M. Hodgson, "Charge Transfer Devices and Their Application," *New Zealand Engineering*, vol. 34, No. 11, Nov. 15, 1979, pp. 246–249.

T. Imaide et al., "Single–Chip Color Cameras with Reduced Aliasing," *Journal of Imaging Technology*, vol. 12, No. 5, Oct. 1986, pp. 258–260.

H. Kawashima et al., "A ¼ Inch Format 250K Pixel Amplified MOS Image Sensor Using CMOS Process," *IEDM Technical Digest*, Dec. 5–8, 1993, pp. 575–578.

S.K. Mendis et al., "Progress in CMOS Active Pixel Image Sensors," *Charge–Coupled Devices and Solid State Optical Sensors IV*—SPIE Proceedings, San Jose, California, Feb. 1994, pp. 19–29.

R.H. Nixon et al., "128×128 CMOS Photodiode–Type Active Pixel Sensor with On–Chip Timing, Control and Signal Chain Electronics," *Charge–Coupled Devices and Solid State Optical Sensors V*—SPIE Proceedings, San Jose, California, Feb. 1995, pp. 117–123.

M. Onga et al., "New Signal–Processing LSIs for the 8mm Camcorder," *IEEE Transactions on Consumer Electronics*, vol. 36, No. 3, Aug. 1990, pp. 494–501.

T. Ozaki et al., "Low–Noise Line–Amplified MOS Imaging Devices," *IEEE Transactions on Electron Devices*, vol. 38, No. 5, May 1991, pp. 969–975.

K.A. Parulski, "Color Filters and Processing Alternatives for One–Chip Cameras," *IEEE Transactions on Electron Devices*, vol. ED–32, No. 8, Aug. 1985, pp. 1381–1389.

S. Tsuruta et al., "Color Pixel Arrangement Evaluation for LC–TV," *Conference Record of the 1985 International Display Research Conference*, San Diego, California, Oct. 1985, pp. 24–26.

T. Watanabe et al., "A CCD Color Signal Separation IC for Single–Chip Color Imagers," *IEEE Journal of Solid–State Circuits*, vol. SC–19, No. 1, Feb. 1984, pp. 49–54.

\* cited by examiner

METHOD AND APPARATUS FOR DIGITAL COLUMN FIXED PATTERN NOISE CANCELING FOR A CMOS IMAGE SENSOR

FIELD OF THE INVENTION

The present invention relates to metal oxide semiconductor (MOS) image sensors and, more particularly, to a method and apparatus for reading out image signals from a CMOS image sensor.

BACKGROUND OF THE INVENTION

Integrated circuit technology has revolutionized various fields including computers, control systems, telecommunications, and imaging. There are a number of types of semiconductor imagers, including charge coupled devices, photodiode arrays, charge injection devices, and hybrid focal plane arrays. Some sensors are referred to as active pixel image sensors (APS). An active pixel image sensor is defined as an image sensor technology that has one or more active transistors within the pixel unit cell. Some types of active pixel sensor technologies include the amplified MOS imager (AMI), charge modulation device (CMD), volt charge modulated device (VCMD), base stored image sensor (BASIS), and the static induction transistor (SIT).

It is desirable in image sensors to remove fixed pattern noise (FPN) from the signals that are processed from the pixels. One prior art circuit for reducing fixed pattern noise is shown in "Progress in CMOS Active Pixel Sensors," by S. K. Mendis et al., *Proceedings of the SPIE—The International Society for Optical Engineering*, Volume 2172, 1994, pages 19–29. The circuit shown in the Mendis et al. reference is patented in U.S. Pat. No. 5,471,515 to Fossum et al. FIG. 3 of the Fossum et al. patent is reproduced herein as FIG. 1.

FIG. 1 is a simplified schematic diagram of one pixel cell of a focal plane array of many such cells formed in an integrated circuit. Referring to FIG. 1, a photogate consists of a relatively large photogate electrode 30 overlying a substrate 20. A charge transfer section consists of a transfer gate electrode 35 adjacent to the photogate electrode 30, a floating diffusion 40, a reset electrode 45, and a drain diffusion 50. A readout circuit consists of a source follower field effect transistor (FET) 55, a row select FET 60, a load FET 65, and correlated double sampling circuit 70.

The readout circuit 70 consists of a signal sample and hold (S/H) circuit including an S/H FET 200 and a signal store capacitor 205 connected through the S/H FET 200 and through the row select FET 60 to the source of the source follower FET 55. The other side of the capacitor 205 is connected to a source bias voltage VSS. The one side of the capacitor 205 is also connected to the gate of an output FET 210. The drain of the output FET is connected through a column select FET 220 to a signal sample output node VOUTS and through a load FET 215 to the drain voltage VDD. A signal called "signal sample and hold" (SHS) briefly turns on the S/H FET 200 after the charge accumulated beneath the photogate electrode 30 has been transferred to the floating diffusion 40, so that the capacitor 205 stores the source voltage of the source follower FET 55 indicating the amount of charge previously accumulated beneath the photogate electrode 30.

The readout circuit 70 also consists of a reset sample and hold (S/H) circuit including an S/H FET 225 and a signal store capacitor 230 connected through the S/H FET 225 and through the row select FET 60 to the source of the source follower FET 55. The other side of the capacitor 230 is connected to the source bias voltage VSS. The one side of the capacitor 230 is also connected to the gate of an output FET 240. The drain of the output FET 240 is connected through a column select FET 245 to a reset sample output node VOUTR and through a load FET 235 to the drain voltage VDD. A signal called "reset sample and hold" (SHR) briefly turns on the S/H FET 225 immediately after the reset signal RST has caused the resetting of the potential of the floating diffusion 40, so that the capacitor 230 stores the voltage to which the floating diffusion has been reset.

The readout circuit provides correlated double sampling of the potential of the floating diffusion, in that the charge integrated beneath the photogate 12 each integration period is obtained at the end of each integration period from the difference between the voltages at the output nodes VOUTS and VOUTR of the readout circuit 70. This eliminates the effects of kTC noise because the difference between VOUTS and VOUTR is independent of any variation in the reset voltage RST, a significant advantage.

The feature of the circuit of FIG. 1 which is useful for eliminating fixed pattern noise due to variations in FET threshold voltage across the substrate 20 is a shorting FET 116 across the sampling capacitors 205 and 230. After the accumulated charge has been measured as the potential difference between the two output nodes VOUTS and VOUTR, a shorting signal VM is temporarily applied to the gate of the shorting FET 116 and the VOUTS-to-VOUTR difference is measured again. This latter difference is a measure of the disparity between the threshold voltages of the output FETs 210, 240, and may be referred to as the fixed pattern difference. The fixed pattern difference is subtracted from the difference between VOUTS and VOUTR measured at the end of the integration period, to remove fixed pattern noise.

As discussed above, the fixed pattern noise that is produced in CMOS image sensors is related to the fact that there are different column amplifiers for each column of a CMOS image sensor pixel array. Column amplifiers generate column fixed pattern noise due to circuit and process variations. As described above, the circuit of FIG. 1 compensates for the fixed pattern noise by subtracting a second differential signal from the first sensed differential signal. As shown in FIG. 1, the difference between the signals of the capacitors for both the first and second differential signals is obtained from an analog subtraction circuit that includes the differential amplifier that amplifies the difference between the signals VOUTS and VOUTR.

One problem with the fixed pattern noise compensation method of FIG. 1 is that in low light environments, if the pixel signal is low, then the gain of the signal amplifier must be increased. If the gain of the signal amplifier is increased, then the fixed pattern noise canceling rate of the above circuit will decrease because of the analog subtraction circuit's inherent errors that result from process variations.

The present invention is directed to a method and apparatus that overcome the foregoing and other disadvantages. More specifically, the present invention is directed to a method and apparatus for reducing fixed pattern noise through the use of a digital subtraction method.

SUMMARY OF THE INVENTION

The present invention is directed to a method and apparatus for canceling the fixed pattern noise generated by an image sensor. The image sensor includes a pixel array with individual pixels organized as rows and columns. The pixel array includes a reference row, which may be created by using a light shield or black layer to cover the cells of the reference row from light. Thus, the only signal that is generated from the sensors of the reference row is a dark signal.

The signals from the image sensor are read by analog signal processing circuitry. In accordance with the invention, the signals from the analog signal processing circuitry are provided to a digital processing structure. The digital processing structure includes an analog-to-digital converter for converting signals from the analog signal processing circuitry. Also included is fixed pattern noise storage circuitry for storing digital signals that are representative of the signals from the reference row of the pixel array. A fixed pattern noise canceling processor receives digital signals representative of the signals from the remaining rows of the pixel array, and subtracts the digital reference row signals so as to produce image data signals that are relatively free of fixed pattern noise. Thus, the canceling rate of the fixed pattern noise depends on the precision of the analog-to-digital converter, rather than the process variations of an analog subtraction circuit. In a low light environment, the fixed pattern noise canceling rate thus remains at a relatively high level, as opposed to a system using an analog subtraction circuit for which a low light environment will cause a significant decrease in the fixed pattern noise canceling rate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
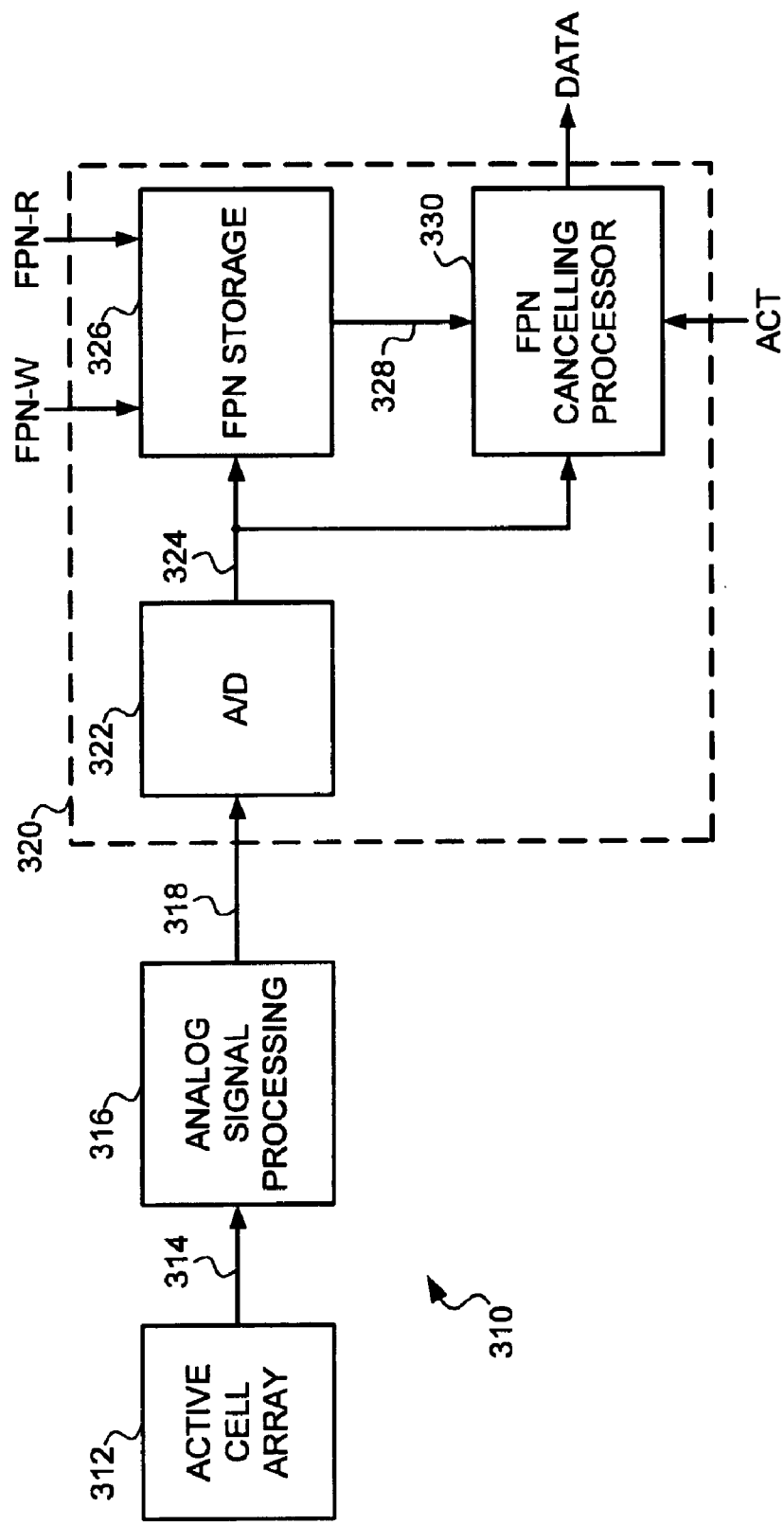
FIG. 2 is a block diagram of a CMOS imaging sensor and readout circuit with a digital processing structure formed in accordance with the present invention.

A CMOS image sensor and readout circuit 310 formed according to the present invention is illustrated in FIG. 2. An active cell array 312 includes a number of pixels organized into rows and columns. The active cell array 312 includes at least one "reference row." The reference row may be placed at the top or bottom of the active array, or somewhere in between. The reference row is created by using a light shield or black layer to cover the cells of the reference row from light. Thus, the only signal that should be generated from the sensors of the reference row is a noise or dark signal. During the readout process, the exposure time of the reference row is the same as it is for the rest of the rows of the active cell array.

Signals from the pixels in cell array 312 are read out through a series of reading lines 314 by analog signal processing circuitry 316. A cell array and analog signal processing of the signals are described in more detail in a copending application entitled "SINGLE CHIP COLOR CMOS IMAGE SENSOR WITH TWO OR MORE LINE READING STRUCTURE,"U.S. Pat. No. 6,289,139, which is hereby incorporated by reference. Analog signal processing circuitry 316 sends signals through lines 318 to a digital processing block 320. Within digital processing block 320, lines 318 connect to an analog-to-digital converter 322. Analog-to-digital converter 322 sends digital signals representing the processed signals through lines 324 to a fixed pattern noise storage circuitry 326 and to a fixed pattern noise canceling processor 330.

Fixed pattern noise storage circuitry 326 receives as control signals FPN-W and FPN-R. When control signal FPN-W is high, fixed pattern noise storage circuitry 326 is activated to write a group of fixed pattern noise signals from the reference row into its storage area, as will be described in more detail below. When control signal FPN-R is high, fixed pattern noise storage circuitry 326 is activated to read out the fixed pattern noise signals that were previously stored. Fixed pattern noise storage circuitry 326 also sends signals through lines 328 to fixed pattern noise canceling processor 330. Fixed pattern noise canceling processor 330 receives a control signal ACT and outputs a data image signal DATA.

Figure 3:
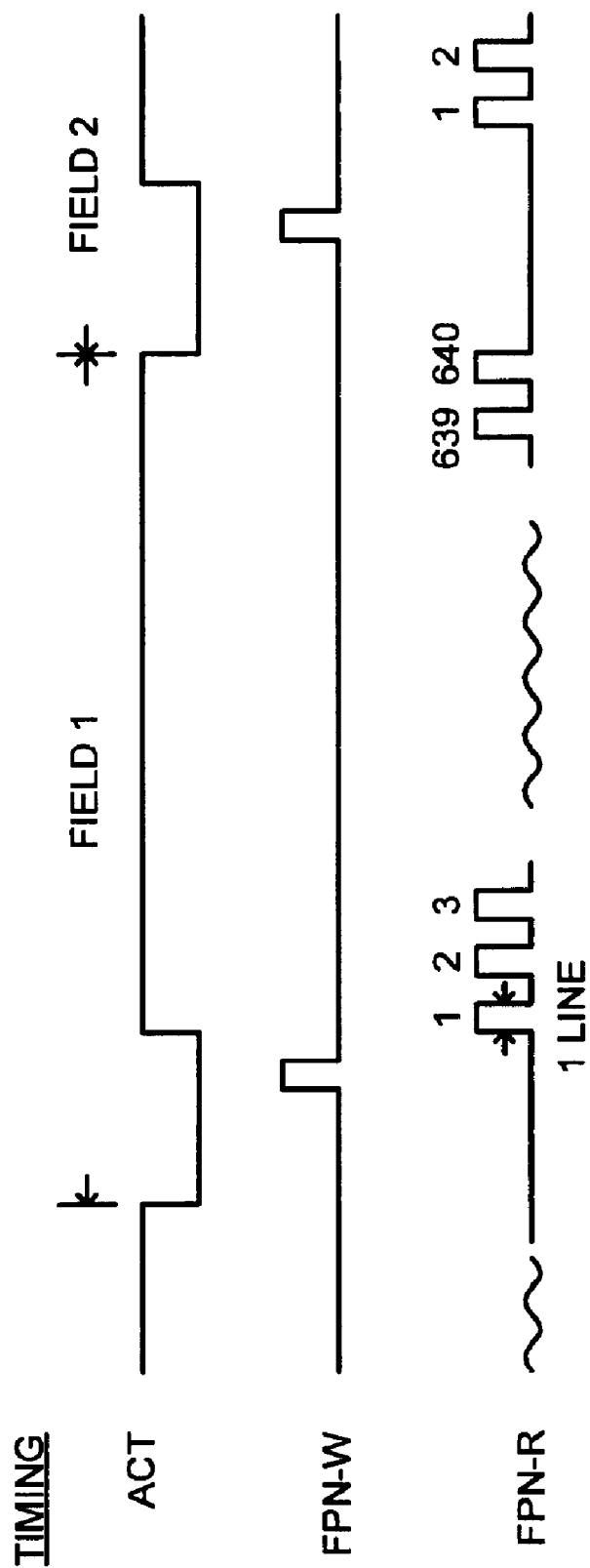
FIG. 3 is a timing diagram illustrating the operation of the readout circuit of FIG. 2.

The operation of the circuit of FIG. 2 will now be described with reference to the timing diagrams of FIG. 3. As illustrated in FIG. 3, the timing signal ACT controls the reading out of each field of the active cell array 312. Thus, at the beginning of the time period FIELD 1, the timing signal ACT goes low. While the timing signal ACT is low, the reference row of the active cell array 312 is read and then converted into digital signals by the analog-to-digital converter 322. In an actual embodiment the analog-to-digital converter 322 has 10-bit or 12-bit capability. This operation occurs as illustrated in FIG. 3 when control signal FPN-W goes high and then low. In the above process, each column fixed pattern noise signal is sequentially stored in a latch unit or SRAM unit represented as fixed pattern noise storage area 326. Once the signals from the reference row are stored in the fixed pattern noise storage area 326, the remaining rows of the array may be processed.

As illustrated in FIG. 3, the process for reading out the remaining rows of the active cell array 312 begins when the timing signal ACT goes high. While the timing signal ACT is high, the signal FPN-R transitions high and then low for the reading of each additional row of the field of the active cell array 312. In the example of FIG. 3, the present field of the active cell array 312 is presumed to have 640 rows. As each additional row of the field of active cell array 312 is read out according to the signal FPN-R, its signals are converted to digital signals by analog-to-digital converter 322 and then have the appropriate column fixed pattern noise signals that are stored in fixed pattern noise storage area 326 subtracted from them by fixed pattern noise canceling processor 330. The image data outputted by fixed pattern noise canceling processor 330 is then relatively free of fixed pattern noise. In addition, to avoid signal processing and analog-to-digital conversion errors, a comparator is used in the fixed pattern noise canceling processor 330 to eliminate any subtraction errors that would result in a negative signal. Once all of the rows of the active cell array 312 have been read out, the signal ACT goes low, thus signaling the end of the time period FIELD 1. Then the process begins again for the time period FIELD 2 where, after a short delay, the signal FPN-W goes high and then low so as to again read out the reference row of the active cell array 312.

The primary advantage of this method is that the canceling rate of the fixed pattern noise depends on the precision of the analog-to-digital converter 322, rather than the process variations of an analog subtraction circuit. Thus, in a low light environment, the fixed pattern noise canceling rate remains at a high level, as opposed to a system using an analog subtraction circuit for which, as described previously, a low light environment will cause a significant decrease in the fixed pattern noise canceling rate.

Figure 4:
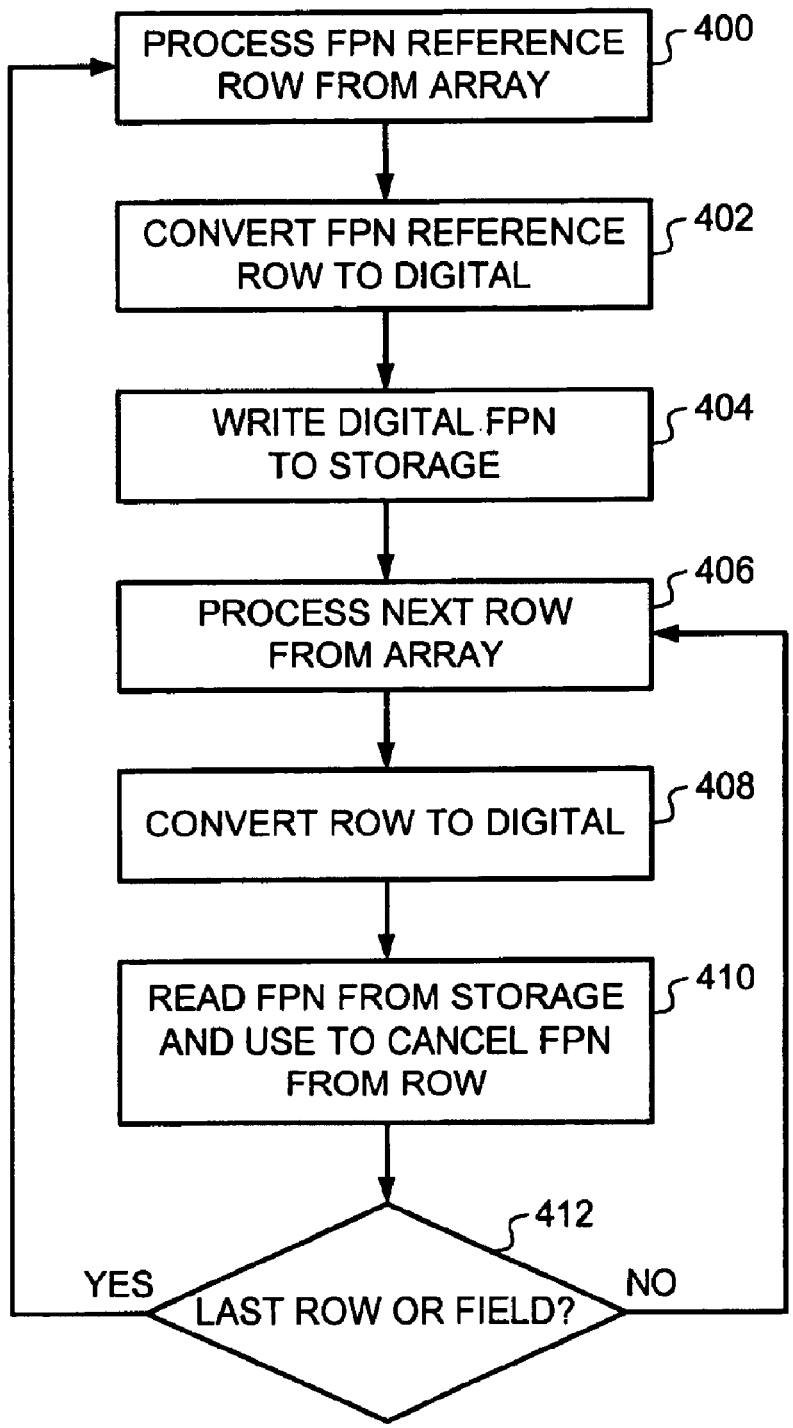
FIG. 4 is a flow diagram illustrating the readout process of the present invention.

A flow chart illustrating the method of the present invention is shown in FIG. 4. At the beginning of a field of reading out the active cell array, the reference row, also known as a "dark row," is processed from the array at a block 400. At a block 402, the reference row is converted to digital values. At a block 404, the digital fixed pattern noise values are stored in a storage area, such as fixed pattern noise storage circuitry 326. Once the fixed pattern noise signals are stored, at a block 406, the next row from the active cell array 312 is processed. At a block 408, the signals from the row of the active cell array are converted to digital values by the analog-to-digital converter 322. At a block 410, the fixed pattern noise canceling processor 330 reads the fixed pattern noise signals from storage and uses them to cancel the fixed pattern noise from the current row signals. The data image signals DATA, which are relatively free of fixed pattern noise, are output by fixed pattern noise canceling processor 330. At the decision block 412, the system determines whether the most recent row that was processed was the last row of the field. If the row was not the last row of the field, then the routine returns to block 406 where the next row from the active cell array is processed. If the most recent row was the last row of the field, then the routine returns to block 400 to start a new field, at the beginning of which the dark row is again sampled.

Figure 1:
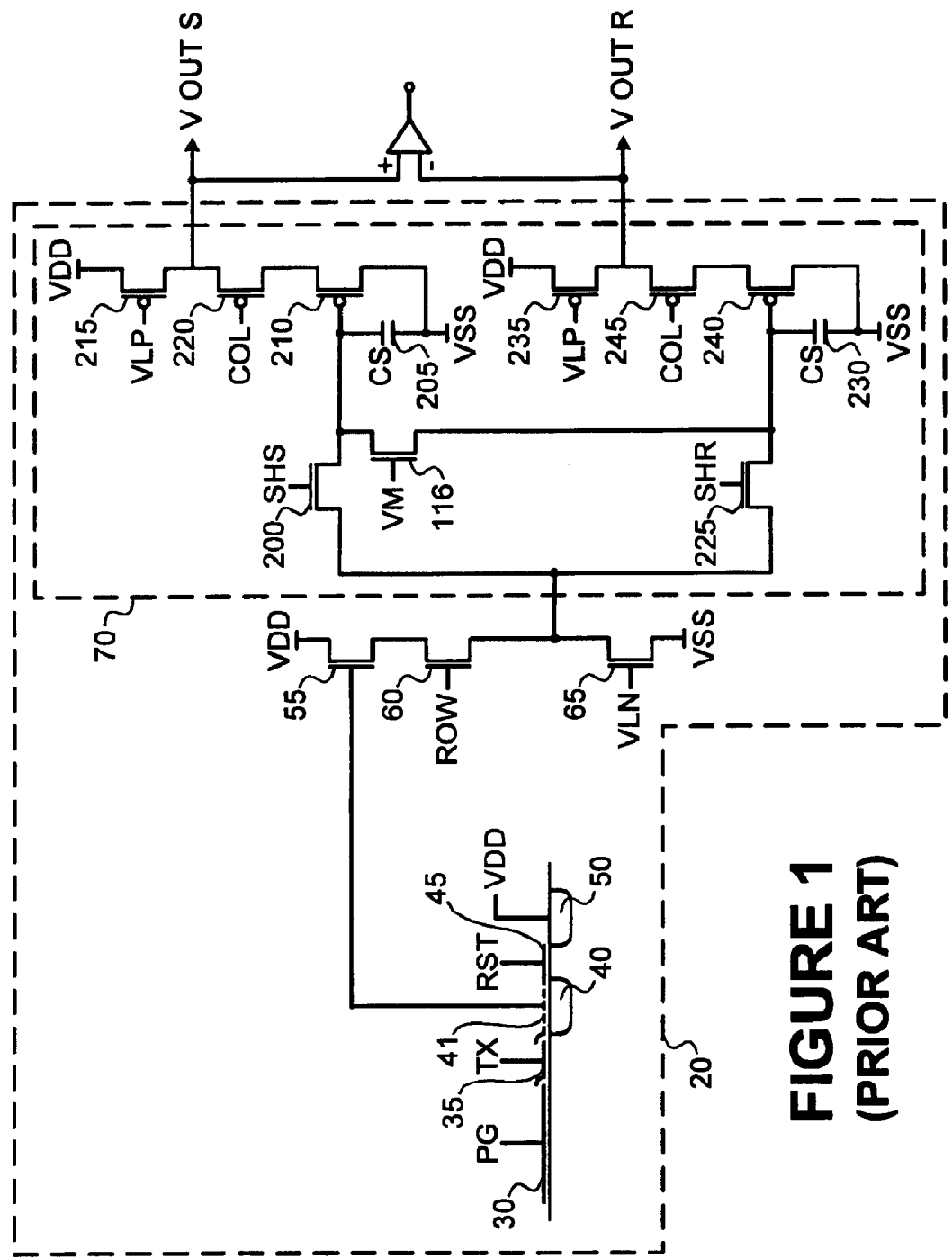
FIG. 1 is a schematic diagram of a prior art CMOS active pixel sensor array.

As described above, this method of the present invention overcomes the primary disadvantage of a prior art circuit such as that illustrated in FIG. 1. As was described with reference to FIG. 1, the canceling rate of the fixed pattern noise was dependent on the process variations of an analog subtraction circuit. Thus, as the gain of the signal amplifier was increased to compensate for lower light environments, the fixed pattern noise canceling rate correspondingly decreased. In contrast, by using the digital conversion method of the present invention, the canceling rate of the fixed pattern noise instead depends on the precision of an analog-to-digital converter. Thus, by using the above-described method and circuitry the fixed pattern noise canceling rate can be made to remain at a high level even in low light environments. In addition, the described circuitry can be fabricated on a single MOS imaging chip.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A MOS image sensor comprising:
    a pixel array formed from a plurality of individual pixels organized as rows and columns, said pixel array including a reference row;
    analog signal processing circuitry for reading out analog signals from the pixel array;
    an analog-to-digital converter for converting analog signals from the analog signal processing circuitry into digital signals;
    fixed pattern noise storage circuitry for storing digital signals representative of the signals from the reference row of the pixel array; and
    a fixed pattern noise canceling processor for subtracting the digital reference row signals stored in the fixed pattern noise storage circuitry from the digital signals representative of the signals from the other pixels in the pixel array.

2. The image sensor of claim 1, wherein the reference row of the pixel array is formed by being covered with a light shield.

3. The image sensor of claim 1, wherein the reference row of the image sensor is located near an edge of the pixel array.

4. The image sensor of claim 1, wherein the circuitry of the MOS image sensor is fabricated on a single MOS chip.

5. The image sensor of claim 1, wherein the analog-to-digital converter has at least 10-bit capability.

6. The image sensor of claim 1, wherein the fixed pattern noise storage circuitry receives a write control signal, the write control signal causing the fixed pattern noise storage circuitry to write the digital signals representative of the signals received from the reference row into the fixed pattern noise storage circuitry.

7. The image sensor of claim 6, wherein the fixed pattern noise storage circuitry also receives a read control signal, the read control signal causing the fixed pattern noise storage circuitry to read out the digital signals representative of the signals from the reference row of the pixel array.

8. The image sensor of claim 7, wherein the write control signal and the read control signal have similar timing such that the exposure time of the reference row is approximately the same as the exposure time of the remaining rows of the pixel array.

9. The image sensor of claim 7, wherein the fixed pattern noise canceling processor receives a field control signal, the field control signal coordinating the timing between the reading of different fields.

10. A digital processing structure for processing signals from a pixel array, said pixel array including a plurality of individual pixels organized as rows and columns, said pixels outputting pixel signals, said pixel array having a reference row, said digital processing structure comprising:
    an analog-to-digital converter for converting the analog signals from the pixel array into digital signals;
    fixed pattern noise storage circuitry for storing digital signals received from the analog-to-digital converter representative of the signals from the reference row of the pixel array; and
    a fixed pattern noise canceling processor for subtracting the signals stored in the fixed pattern noise storage circuitry from the digital signals representative of the analog signals from the remaining rows of the pixel array.

11. The digital processing structure of claim 10, wherein the analog-to-digital converter has at least 10-bit capability.

12. The digital processing structure of claim 10, wherein the fixed pattern noise storage circuitry receives a write control signal, the write control signal causing the fixed pattern noise storage circuitry to write the digital signals representative of the signals received from the reference row into the fixed pattern noise storage circuitry.

13. The digital processing structure of claim 12, wherein the fixed pattern noise storage circuitry also receives a read control signal, the read control signal causing the fixed pattern noise storage circuitry to read out the digital signals representative of the signals from the reference row of the pixel array.

14. The digital processing structure of claim 13, wherein the write control signal and the read control signal have similar timing such that the exposure time of the reference row is approximately the same as the exposure time of the remaining rows of the pixel array.

15. The digital processing structure of claim 13, wherein the fixed pattern noise canceling processor receives a field control signal, the field control signal coordinating the timing between the reading of different fields.

16. The digital processing structure of claim 10, wherein the digital processing structure and the pixel array are formed on a single MOS imaging chip.

17. A method for reading out signals from an image sensor having a pixel array of a plurality of individual pixels organized as a plurality of rows and columns, said pixel array having a reference row, said method comprising the steps of:
   (a) reading out the signals from the reference row of the pixel array;
   (b) converting the reference row signals to digital values and storing the digital reference row signals;
   (c) reading the signals from an additional row of the pixel array;
   (d) converting the additional row signals to digital values; and
   (e) subtracting the stored digital reference row signals from the digital additional row signals.

18. The method of claim 17, wherein steps (c)–(e) are repeated for additional rows from the pixel array until all of the rows of the pixel array have been read out.

19. The method of claim 18, wherein after all of the rows of the pixel array have been read out, the entire process starting with steps (a) and (b) is repeated.

20. The method of claim 17, wherein the timing for the reading of the reference row in step (a) is similar to the timing for the reading of an additional row in step (c), such that the exposure time of the reference row is the same as for an additional row.

21. The method of claim 17, wherein the digital conversion is done with at least 10-bit capability.

22. A method for compensating for fixed pattern noise in a MOS image sensor, said MOS image sensor having a pixel array of a plurality of individual pixels organized as a plurality of rows and columns, said pixel array having a reference row, said method comprising the steps of:
   (a) reading out the signals from the reference row of a pixel array;
   (b) converting the reference row signals to digital values and storing the digital reference row signals; and
   (c) using the stored digital reference row signals to compensate for fixed pattern noise in the signals from additional rows of the pixel array.

23. The method of claim 22, wherein the method of compensating for fixed pattern noise in step (c) comprises converting the additional row signals to digital values and subtracting the stored digital reference row signals from the digital additional row signals.

24. The method of claim 22, wherein the digital conversion is done with at least 10-bit capability.

* * * * *